United States Patent [19]
Henderson

[11] 3,710,689
[45] Jan. 16, 1973

[54] HYDRAULIC STEERING SYSTEM

[75] Inventor: Donald LeRoy Henderson, Waterloo, Iowa

[73] Assignee: Deere & Company, Moline, Ill.

[22] Filed: Jan. 25, 1971

[21] Appl. No.: 109,218

[52] U.S. Cl. .......................91/388, 91/420, 92/108
[51] Int. Cl. ............................................F15b 13/16
[58] Field of Search ..........91/388, 401, 420; 92/108

[56] References Cited

UNITED STATES PATENTS

| | | | |
|---|---|---|---|
| 2,261,444 | 11/1941 | Neubert, Jr. | 91/401 |
| 3,063,425 | 11/1962 | Vier et al. | 91/388 |
| 3,511,133 | 5/1970 | Day | 91/388 |

*Primary Examiner*—Paul E. Maslousky
*Attorney*—H. Vincent Harsha, Harold M. Knoth, William A. Murray, John M. Nolan and Jimmie R. Oaks

[57] ABSTRACT

A vehicle includes a steering wheel which is linked to a steering valve for shifting the latter from a neutral position to first and second active positions for causing respective extension and retraction of a two-way steering cylinder. Formed within the steering cylinder is a follow-up cylinder which extends and retracts in unison with the steering cylinder. A two-way slave cylinder is linked to the steering valve and has opposite ends respectively fluidly connected to one end of the steering cylinder and to the follow-up cylinder such that when turning of the steering wheel is stopped, the slave cylinder shifts to return the steering valve to the neutral position. The displacement of the follow-up and slave cylinders are matched to permit full-stroke operation of the steering cylinder. A fixed volume of control fluid is trapped between the follow-up and slave cylinders. Connected in the return line from the steering cylinder is a pilot-operated valve which is responsive to the control fluid pressure for opening the return line only when the steering valve occupies an active position.

7 Claims, 1 Drawing Figure

PATENTED JAN 16 1973 3,710,689
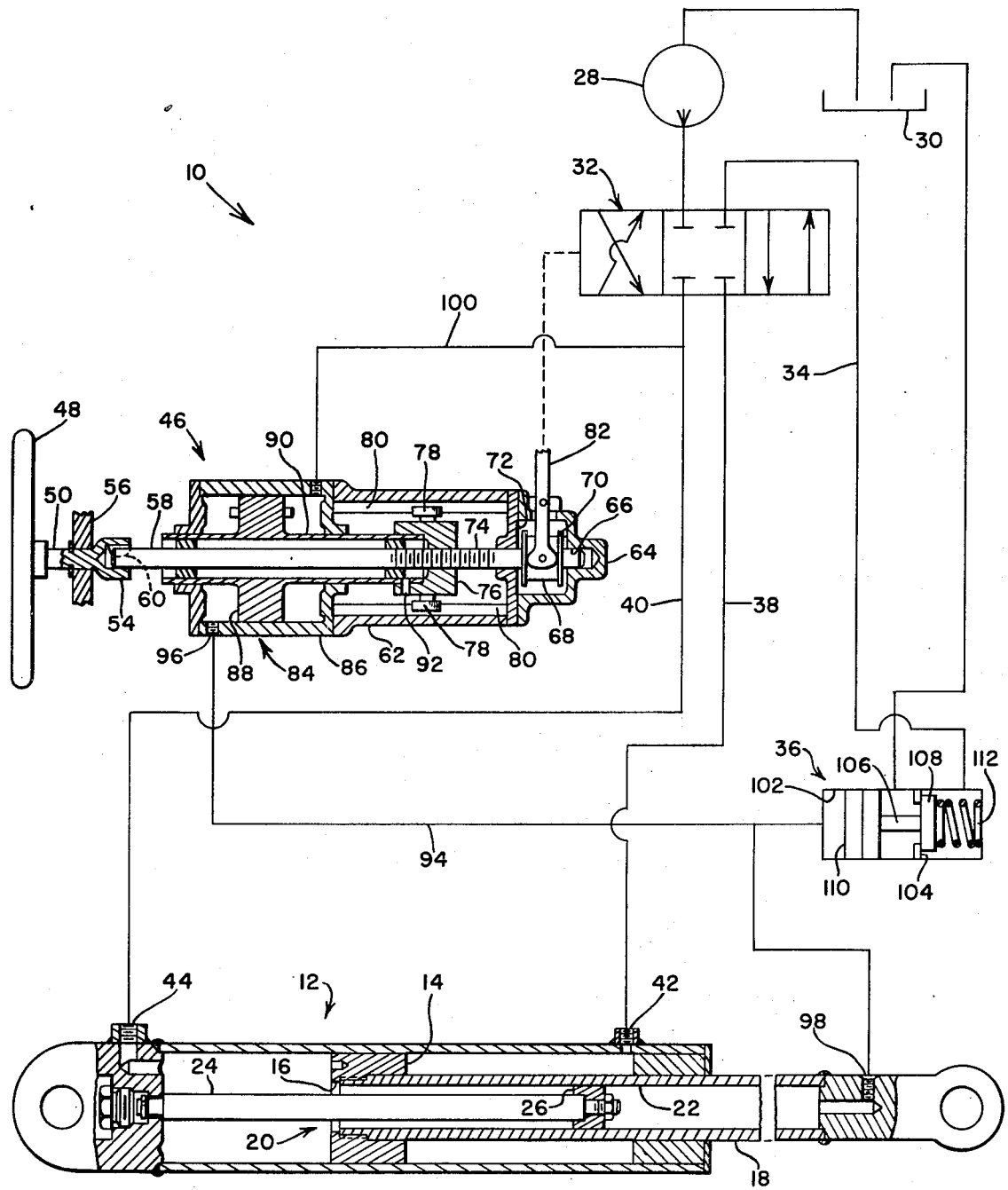
INVENTOR.
D. L. HENDERSON

HYDRAULIC STEERING SYSTEM

BACKGROUND OF THE INVENTION

The present invention relates to a vehicle steering system of the type wherein a steering wheel is turned to selectively actuate a steering valve, the valve being returned to neutral by the action of follow-up and slave cylinders once turning of the steering wheel has ceased. More particularly, the present invention relates to a combined steering and follow-up cylinder.

Steering systems of the above-described type are commonly used for steering articulated vehicles. In such vehicles, first and second body sections are pivotally interconnected by a vertical pivot structure and normally a pair of steering linkages, including steering cylinders, extend between the body sections at opposite lateral sides of the pivot structure. The follow-up cylinder is mounted adjacent and is connected to one of the steering linkages and is fluidly connected to the slave cylinder which is remotely located in the vicinity of the steering wheel.

The steering action with known systems has proved to be somewhat unsatisfactory. One problem experienced is that steering tends to be jerky due to a lag in the responsiveness of the follow-up cylinder caused by the usual slack or looseness which is found in the connections of the follow-up cylinder with the steering linkage.

Another problem encountered is that it is sometimes difficult to find available space for mounting the steering cylinders, the follow-up cylinder and the necessary hoses in the vicinity of the pivot structure.

A disadvantage of many prior art steering systems is that major system components are only compatible with steering cylinders having a predetermined displacement thus limiting the interchangeability of steering cylinders and other components among systems.

SUMMARY OF THE INVENTION

According to the present invention there is provided a novel steering system. Specifically, there is provided a system including a compact steering and follow-up cylinder design and exhibiting smooth, responsive steering characteristics.

It is an object of the invention to provide a steering and follow-up cylinder design wherein the follow-up cylinder is located within and acts in unison with the steering cylinder.

Another object of the invention is to provide a steering and follow-up cylinder design wherein steering cylinders having different stroke lengths and force capabilities may be selected for use in the system without necessitating changes in the remainder of the system.

Still another object is to provide a steering system wherein the follow-up and steering cylinders have a matched displacement, wherein a fixed volume of control fluid equal to this displacement is connected between the follow-up cylinder and one end of the slave cylinder and wherein a pilot-operated return valve is responsive to the pressure of the control fluid to permit the steering cylinder to exhaust only when the steering control valve is in an active position.

These and other objects will be apparent from the ensuing description and the appended drawing.

BRIEF DESCRIPTION OF THE DRAWING

The sole FIGURE is a schematic diagram of the hydraulic steering system embodying the principles of the invention and showing the steering, follow-up and slave cylinders in section.

DESCRIPTION OF THE PREFERRED EMBODIMENTS

Referring now to the drawing, a hydraulic steering system is indicated in its entirety by the reference numeral 10. The system 10 is particularly suited for, but not limited to use with an articulated, body-steered vehicle (not shown) of a common type having first and second body sections interconnected by a vertical pivot structure.

The steering system 10 includes a two-way steering cylinder or motor 12 having suitable connections at its opposite ends for receiving pivot pins for mounting the cylinder in a steering linkage. The cylinder 12 includes a piston 14 through which extends a coaxial bore 16. One end of a piston rod 18 is threadedly received in the bore 16.

A one-way follow-up cylinder or motor 20 is located within the steering cylinder 12 and includes a bore 22 located coaxially in the piston rod 18. A rod 24 is disposed coaxially within the cylinder 12, its left end being fixed to the head end of the cylinder and its right end terminating in the bore 22 and carrying a cylindrical seal 26 thereon. Thus, it can be seen that the piston rod 18 is telescopically received on the rod 24 and the steering and follow-up cylinders 12 and 20, respectively, extend and retract in unison, there being no lag in response between the steering and follow-up cylinders.

Fluid for operating the steering cylinder 12 and, hence, the follow-up cylinder 20 is supplied by a pump 28 which has its inlet connected to a sump 30 and its outlet connected to a steering control valve 32. The sump 30 is likewise connected to the control valve 32 by a return line 34 in which is located a return control valve 36, described in detail below. A pair of motor lines 38 and 40 connect the valve 32 with right and left work ports 42 and 44, respectively, at the opposite ends of the cylinder 12. The steering valve 32 is shown in a central neutral position wherein the outlet of the pump 28 and the return line 34 are blocked from communication with the work ports 42 and 44. The work ports 42 and 44 are selectively pressurized by shifting the steering valve 32 respectively to the left and to the right to a pair of active positions, the remaining work port being connected to the return line 34.

The steering control valve 32 is selectively shifted from its neutral to its active positions through means of a steering valve control linkage indicated generally by the reference numeral 46. The valve control linkage 46 includes a steering wheel 48 from the hub of which projects a stub shaft 50, which terminates in a socket 54 and is rotatably mounted in a fixed tractor frame member 56. A shaft 58 has its left end, as viewed in the drawing, received in the socket and is connected thereto by means of a key or spline, at 60, so arranged that the shaft 58 turns with the stub shaft 50 but has relative axial movement. Disposed about the shaft 58 is a housing 62 including a cap 64 which journals the right end of the shaft 58 as at 66. Also located in the cap 64 is an operating collar 68 which is pinned to the shaft 58. An internal surface 70 of the cap 64 and a wall 72 in the housing 62 provide axially-spaced stops or abutments which are respectively engageable by opposite radial faces of the collar 68 to establish axial limits on the axial movement of the shaft 58.

An intermediate portion of the shaft 58 is threaded, at 74, and a nut 76 is threaded onto the threaded portion 74. The nut 76 is prevented from rotating by followers or rollers 78, on the opposite sides of the nut 76, which engage tracks 80 formed in the interior of the housing 62.

From the description thus far, it will be seen that if the steering wheel 48 is turned one way or the other, the shaft 58 will travel axially in one or the other direction relative to the nut 76. This axial movement of the shaft 58 is transferred through a linkage 82 having its opposite ends connected to the collar 68 and the valve 32 to shift the latter from its neutral position to one or the other of the active positions.

For the purpose of returning the steering control valve 32 to its neutral position once the operator has ceased turning the steering wheel 48, there is provided a two-way slave cylinder or motor 84 which includes a cylinder 86 incorporated in the left portion of the housing 62. A piston 88 is disposed in the cylinder 86 and attached thereto is a hollow piston rod 90, which is journaled on the shaft 58. The right end of the piston rod 90 is pinned, as at 92, to the nut 76 to constrain the latter for shifting axially with the piston rod. The slave motor 84 and hence the piston rod 90 is under the control of the follow-up cylinder 20 to which the slave cylinder is connected by means of a conduit or line 94 extending between a work port 96 at the left end of the cylinder 84 and a work port 98 at the right end of the cylinder 20. The displacements of the follow-up and slave cylinders are matched and a fixed volume of fluid equal to this displacement is trapped for movement between the cylinders via the line 94. The right end of the cylinder 84 is connected, via a line 100, to the motor line 40 for simultaneous pressurization and exhaustion with the left end of the steering cylinder 12.

The return control valve 36 includes a bore 102 having an annular valve seat 104 located intermediate the ends thereof. A piston rod 106 is disposed axially in the bore 102 and includes a valve member 108 and a piston 110 respectively at the right and left ends thereof. A spring 112 acts between the right end of the bore 102 and the valve member 108 and biases the latter towards a closed position wherein it is in engagement with the seat 104. Connected to the left end of the bore for acting on the piston rod 106 in opposition to the spring 112 is the control fluid carried in line 94. That portion of the return line 34 extending between the valves 32 and 36 is connected to the bore 102 at a location to the left of the valve seat 104 while that portion of the return line 34 extending between the valve 36 and the reservoir 30 is connected to the bore 102 at a location to the right of the valve seat 104. Thus, it can be seen that the steering cylinder 12 will extend and retract only when the valve 32 has been shifted to an active position.

For the purpose of discussing the operation of the steering system, it is assumed that the steering cylinder is appropriately connected between the front and rear body sections of an articulated vehicle for causing right and left steering respectively upon turning the steering wheel clockwise and counterclockwise.

Thus, rightward steering of the vehicle is initiated by turning the steering wheel 48 clockwise. The resistance of the vehicle sections to turning acts through the hydraulic system to hydraulically lock the piston 88 in the slave cylinder 84, which thus temporarily fixes the position of the piston 88 as well as that of the nut 76. Because of the threads on the nut 76, the turning of the steering wheel causes an advance of the steering shaft 58 to the right, thus shifting the collar 68 to the right against the stop surface 70 and rocking the linkage 82 to shift the steering control valve to the left of the illustrated neutral position to an active position wherein the pump 28 is connected to the motor line 40 and the return line 34 is connected to the motor line 38. Initially the return control valve 36 is closed, blocking the return of fluid from the right side of the cylinder 12. However, the introduction of fluid pressure into the motor line 40 will cause an increase in fluid pressure at the right side of the slave motor piston 88 which will simultaneously cause an increase in pressure in the control fluid trapped between the left side of the piston 88 and the right side of the seat 26 of the follow-up cylinder 20. This increase in pressure of the control fluid is sufficient to open the return control valve 36 against the force exerted by the spring 112, thus permitting the right end of the cylinder 12 to exhaust to the sump 30. The steering cylinder 12 will then begin to extend to steer the vehicle to the right. As the cylinder 12 extends, the volume delimited by the seal 26 and the bore 22 of the follow-up cylinder 20 increases thus allowing the slave-motor piston 88 to shift to the left. If the operator continues turning the steering wheel 48 clockwise, the shaft 58 will remain shifted to the right and the linkage 82 and the valve 32 will remain unaffected despite the leftward shifting of the piston 88, rod 90 and the nut 76. It is to be noted that the matched displacements of the follow-up and slave cylinders 20 and 84, respectively, permit the steering cylinder 12 to become fully extended upon turning the steering wheel the necessary amount.

If it is desired to maintain a steering radius while the vehicle is being turned to the right, it is necessary only for the operator to cease turning the steering wheel 48. Upon cessation of the turning, the leftward movement of the cylinder 88 will, because of the pinned-together rod 90 and nut 76, cause the shaft 58 to shift to the left, which in turn results in rocking the linkage 82 and shifting the valve 32 back to its neutral position.

Leftward steering of the vehicle is of course initiated by the operator turning the steering wheel 48 counterclockwise whereupon the shaft 58 will be advanced to the left which causes rocking of the linkage 82 and shifting of the steering control valve 32 to the right to an active position wherein the pump 28 is connected to the motor line 38 and the return line 34 is connected to the motor line 40. Again, the return line control valve 36 is initially closed. However, the fluid pressure in the line 38 acts against the right side of the steering cylinder piston 14, which in turn acts to pressurize the fluid trapped between the left side of the piston 14 and the right side of the slave motor piston 88. The piston 88 in turn acts against the control fluid at its left side and causes the valve 36 to open. Thus, the left end of the cylinder 12 is then connected to the sump 30 and the cylinder 12 begins to retract to cause left steering. As the cylinder 12 contracts, the follow-up cylinder 20 likewise retracts and forces fluid from the bore 22 into the work port 96 at the left side of the slave cylinder piston 88, which causes the latter to shift to the right. Unless the operator continues to turn the steering wheel 48 counterclockwise, the shaft 58 will be carried rightward with the piston 88, thus rocking the linkage 82 and returning the steering control valve 32 to its neutral position.

I claim:

1. In a steering system of the type including a pump; a reservoir; a two-way steering motor; a steering control valve means having pressure and return lines connected respectively to the pump and reservoir and a pair of motor lines connected respectively to the opposite work ports of the steering motor, said valve means being shiftable among a neutral position, wherein fluid is blocked in the work ports of the steering motor, and first and second active positions wherein one or the other of the steering motor work ports is connected to the pump while the remaining work port is connected to the reservoir; steering linkage means for shifting said valve means from the neutral to the active positions and including a two-way, follow-up slave motor for returning said valve means to the neutral position, the slave motor having one end connected to one of the pair of motor lines, and having its other end connected to a trapped volume of fluid, the improvement comprising: said steering motor having a hollow piston rod slidably received on a seal fixed in the steering motor, thus defining a follow-up motor; said other end of the slave motor being connected to the interior of said hollow piston rod and cooperating therewith to confine said trapped volume of fluid; a pilot-operated return fluid control valve connected between said steering control valve means and said sump; bias means normally urging said pilot-operated valve to a closed position preventing the return of fluid to the sump; said pilot-operated valve including pressure responsive means connected to said trapped volume of fluid and responsive to a predetermined pressure thereof caused by shifting said steering control valve means to one or the other of its active positions.

2. The invention defined in claim 1 wherein the displacements of said follow-up and slave motors are equal whereby the steering motor can undergo a full stroke.

3. The invention defined in claim 1 wherein said seal is fixed to one end of a rod disposed coaxially within the steering motor, the other end of the rod being fixed to one end of said steering motor; and said hollow piston rod telescopically receiving said rod.

4. A hydraulic steering system comprising: a source of pressurized fluid; a sump-connected return line; a two-way piston and rod-type steering cylinder having first and second motor lines respectively connected to its opposite ends; a steering control valve means connected to the source of pressurized fluid, the return line and the first and second motor lines, the valve means being selectively shiftable from a neutral position blocking flow to and from the motor lines to first and second active positions respectively connecting pressurized fluid to the first and second motor line while connecting the remaining motor line to the return line; steering input means connected to the steering control valve means and being responsive to selected continuous right and left steering signals for shifting the control valve means to and retaining the control valve means in one and the other of the first and second active positions; and followup means for restoring said steering control valve means to its neutral position upon cessation of said steering signals, said follow-up means including a follow-up cylinder formed interiorly of said steering cylinder and including a bore extending coaxially within the piston rod of said steering cylinder, said bore being slidably mounted on a seal fixed in said steering cylinder, whereby the volume delimited by the bore and seal will expand and contract in unison with extension and retraction of said steering cylinder; a two-way slave cylinder having one end connected to the interior of the bore of the follow-up cylinder and cooperating therewith to confine a fixed volume of control fluid, the other end of said slave cylinder being connected to one of said first and second motor lines, whereby the slave cylinder will shift in a first direction during extension of the steering cylinder and will shift in the opposite direction during retraction of the steering cylinder; connection means extending between said slave cylinder and said steering control valve means operative only upon cessation of said input signals for coupling the shifting movements of said slave cylinder with said steering control valve means for restoring the latter to its neutral position; a pilot-operated return fluid control valve connected between said steering control valve means and said sump; bias means normally urging said pilot-operated valve to a closed position preventing the return of fluid to the sump; said pilot-operated valve including pressure responsive means connected to said trapped volume of fluid and responsive to a predetermined pressure thereof caused by shifting said steering control valve means to one or the other of its active positions.

5. The invention defined in claim 4 wherein the displacements of said follow-up and slave cylinders are equal.

6. In a hydraulic steering system of the type including a pump, a reservoir, a two-way hydraulic steering motor having firs and second work ports, a control valve means being connected to said pump, reservoir and steering motor and being selectively shiftable from a neutral position wherein fluid is blocked in the steering motor to maintain a course of travel, to first and second active positions wherein said first and second work ports are respectively connected to said pump while the remaining work port is connected to said reservoir for respectively initiating right and left steering, control linkage means connected to said valve means for selectively shifting the latter to said first and second active positions respectively in response to right and left steering input signals, and follow-up means connected to said linkage means for restoring said valve means to the neutral position upon cessation of said input signals, the improvement wherein said follow-up means includes: a two-way slave motor having first and second work ports and being connected to said linkage means such that by respectively pressurizing said first and second ports said valve means will be returned to neutral from said first and second active positions; said first slave motor port being connected to said first steering motor port; said steering motor having a hollow piston rod defining a master cylinder; seal means fixed in said steering motor and said piston rod being slidably mounted on said seal means; said second slave motor port being connected to the interior of said piston rod; a pilot-operated return fluid control valve connected between said steering control valve means and said sump; bias means normally urging said pilot-operated valve to a closed position preventing the return of fluid to the sump; said pilot-operated valve including pressure responsive means connected to said trapped volume of fluid and responsive to a predetermined pressure thereof caused by shifting said steering control valve means to one or the other of its active positions.

7. The invention defined in claim 6 wherein said master and slave cylinders have equal displacements.

* * * * *